United States Patent [19]
Meyer

[11] 3,923,946

[45] Dec. 2, 1975

[54] COMPOSITE MATERIALS

[75] Inventor: Rene Meyer, Grenoble, France

[73] Assignee: Ugine Carbone, Grenoble, France

[22] Filed: May 20, 1974

[21] Appl. No.: 471,475

[30] Foreign Application Priority Data
May 17, 1973 France .............................. 73.17847

[52] U.S. Cl. ................................ 264/111; 264/122
[51] Int. Cl.² ............................................ B22F 3/00
[58] Field of Search ............................ 264/111, 122

[56] References Cited
UNITED STATES PATENTS
3,341,642 9/1967 Mahar et al. .................. 264/111 X Primary Examiner—Lewis T. Jacobs

[57] ABSTRACT

A rigid composite material based on metal particles and a polymer binder present in an amount of between 5 and 20% by volume and adapted for use in the production of precision components.

6 Claims, No Drawings

COMPOSITE MATERIALS

This invention relates to a new composite material based on metal powder and plastics material.

It has previously been proposed to manufacture high-precision mechanical components from a metal/polymer composite material. Thus, bearings have been manufactured from so-called charged polymers in which the proportion of polymer is of the order of 60 to 70% by volume, the material having the characteristics of a plastics material, as reflected in particular in its limited hardness.

According to U.S. Pat. No. 3,300,329, metal particles are coated with plastics material. Components are manufactured by pressure molding where the proportion of polymer is high.

It is specified that the coated particles, suitable for pressure molding, contain from 10 to 80% by weight of polymer. When the proportion of polymer is low, the coated particles are only suitable for the production of pigments. This is confirmed by the examples, in which a mixture is used which contains 10% by weight of polymer to 90% of copper powder, corresponding to a proportion by volume of the order of 45% polymer to 55% copper. In another example, the mixture used contains 42% by weight polymer to 58% aluminum powder, corresponding to a proportion by volume of 62% of polymer to 38% of aluminum.

The present invention relates to a composite metal/polymer material which can be used for manufacturing precision structural components, and to a simple process for manufacturing precision components of this material.

The composite material according to the invention is a rigid, agglomerated material consisting essentially of an intimate mixture of metal particles and plastics material with a proportion of voids of less than 5%, distinguished by the fact that the volume of the plastic binder amounts to between 5 and 20% of the total volume, preferably to between 10 and 15% of the total volume.

The metal phase is made up of compact, non-porous particles of at least one metal combining high mechanical strength with high ductility before compression.

The metals used are, for example, iron, extra-soft steel, malleable cast iron, aluminum, copper and their alloys. Those metals, which can readily be cold-worked under the conditions, onto which the components are manufactured (for example iron, copper) enable a higher degree of hardness to be obtained.

The binder phase consists of at least one polymer which shows high mechanical strength and adheres firmly to the particles of the metal phase.

The products according to the invention have a compact texture of metal particles bonded together by a film of plastics material. In addition, the plastics material almost completely fills the voids between particles.

This texture is remarkable in that it comprises only a low proportion by volume of plastic binder within the critical limits of 5 to 20% of the total volume. It has surprisingly been found that the curves representing the variations in the tensile strength and flexural strength of the composite materials, cold-molded under high pressure and then consolidated by baking, based on metal powder and plastic binder, as a function of the proportion by volume of binder, showed maxima for values proportional to the volume of binder situated within these limits.

It has also surprisingly been found that, in the case of the composite materials according to the invention, the ratio of the Brinell hardness HB of the end product to the elastic limit in $N/mm^2$ of the metal of the particles is distinctly higher than in the case of conventional sintered metals, in particular low alloy steels, where it is of the order of 0.3. The subject matter of the invention thus has a remarkable hardness in relation to its resistance. This is especially significant when the manufacturing conditions have caused a high rate of crushing of the metallic granules.

These properties will be illustrated by the following examples:

In view of the high volumetric metal content and the compactness of the product, it has a considerable electrical and heat conductivity, and a rather high modulus of elasticity.

The subject matter of the invention may also contain one or several additional materials, to obtain particular core or surface qualities, for example, due to a hard substance to increase the friction coefficient, or due to a solid or liquid lubricant to provide antifriction properties, or even by addition of a pigment to change the color.

To manufacture this material, the applicant has perfected a simple method which also is part of the invention and which consists of preparing an intimate mixture of metal particles and binder in volume proportions of the finished product, compressing this mixture at ambient temperature in a closed die, at a pressure at least equal to twice the limit of elasticity of the metal of the particles, removing the material from the mold, heating the product thus obtained to a temperature sufficient to make it fluid, and possibly polymerize the plastic binder, and allowing it to cool.

In cases where a powdered resin is used, the particles preferably have a gain size of less than 50 m in order to obtain, in the mixture, a uniform distribution of this polymeric phase around the metal particles. In general, the particles have a larger grain size in thb range from 300 to 500 $\mu$. It is of advantage to use a powdered resin because the electrostatic attraction, between the particles of the mixture. promotes uniform distribution and prevents segregation during application of the process.

In cases where a dissolved resin or liquid resin is used, the metal particles are coated by kneading under heat, the solvent being eliminated by evaporation. The plastic binder is selected by testing both depending upon the type of metal powder and upon the required mechanical properties. The resin is, preferably, a thermosetting resin (epoxy resins, phenolic resins, polyesters, polyimides, etc.) which is introduced into the mixture in partly polymerized form and which liquefies on heating before ultimately hardening.

The grain distribution and geometry of the particles of the mixture should be such that compressibility (represented by the density of the compact after application of a given pressure) is as high as possible, so as to obtain a compact material.

The cleanness of the metal particles, the absence of oxidation, and a certain amount of surface roughness, all promote bonding between metal and plastic in the end product.

The proportion by weight of plastic binder in the starting mixture corresponds to a proportion by volume of 5% to 20% in the end product; in other words, it is, for example. of the order of 0.8 to 3.8% by weight for a mixture of iron powder (density of iron 7.8) and a resin of density 1.2, and of the order of 2.2 to 10% by weight for a mixture of aluminum powder (density of aluminum 2.7) and a resin of density 1.2.

Compression is carried out with presses and tooling commonly used in powder metallurgy. The pressure, amounting to at least twice the elastic limit of the metallic material, is substantially in the range from 100–800 N/mm$^2$ and even 1,000 Newton/mm$^2$. Any increase in pressure, under otherwise the same conditions, is accompanied by an increase in hardness and an increase in strength. This is attributable to the increase in the density of the compact and to the more intense cold-working of the metal particles. To facilitate compression and, subsequently, ejection of the compact, it is of advantage to lubricate the spindles and the walls of the mold. It is also possible to add to the mixtures of powders a small quantity (a few tenths of a percent) of fine particles of a solid lubricant or of a highly volatile lubricant capable of being eliminated through the open pores of the compact at the beginning of heating.

The components released from the mold are air baked in an oven for a period and at a temperature appropriate both of melting (thermoplastic binder) and to polymerization (thermosetting binder) of the plastic phase. In most cases, baking lasts for 30 minutes to 1 hour at a temperature in the range from 150° to 250°C for conventional resins. Inside the compact, the polymer liquefies and forms a film between the metal particles which fills most of the voids by capillary action without any surface exudation, because it is only used in a small quantity.

Rigid, precision components, identical in shape and size with the compact before heating, are obtained after cooling. This process is particularly suitable for the production of small precision moldings in large numbers.

The properties of the material according to the invention can be defined in advance, within a fairly wide range, by varying the type and proportions of the constituents of the mixture, the shape of the particles, and the compression rate, on the basis of the principles discussed above. Baking at a moderate temperature prevents deformation and contraction reactions between metal phase and additives, if any, and oxidation of the metal.

The process according to the invention, which is extremely simple and inexpensive, can be applied to metal powders which are not suitable for sintering.

The material according to the invention can also be produced by preparing a compressed blank of metal powder, as by impregnating it with liquid resin, followed by baking. Unfortunately, this process is not as practical as the process previously described.

The material according to the invention has the following advantages over plastics materials filled with metal powders:
better mechanical characteristics;
greater hardness and, hence, higher resistance to wear by friction or rolling;
a lower coefficient of expansion similar to that of the starting metal;
better thermal conductivity;
metallic appearance;
lower material costs.

In comparison with sintered metals, the material according to the invention is more resistant to corrosion, has no open porosity, shows high electrical resistivity which can be adapted to meet requirements and greater dimensional precision.

The following examples illustrate the process for manufacturing the materials according to the invention and their qualities.

EXAMPLE 1

Commercial grade, highly compressible, atomized and annealed iron powder, with a grain size of less than 150 $\mu$ (type Hoganas ASC 100-29), is mixed dry for a period of 60 minutes with various proportions of powdered epoxy resin with a grain size of less than 50 $\mu$ (type Scotchcast 265). The resin was checked for regular distribution. The mixture of powders was compressed under a pressure of 800 Newton/mm$^2$ in floating molds with walls lubricated with stearic acid, to form flat bars measuring 60 × 10 × 5 mm, standard tensile test specimens. The compacts had a residual porosity of 4%. On being released from the mold, the moldings were found to have undergone a reduction of 0.25% in their horizontal dimensions. They were baked in air for 20 minutes at 200°C. The horizontal dimensions of a series of identical moldings were found to vary by, at most, 0.02 mm over 60 mm. The moldings had a smooth surface and did not show any signs of rusting after exposure to the atmosphere for several days.

With various proportions by weight of resin in the initial mixture, the following characteristics were obtained in the end products:

| Mixture Weight of resin | Volume of resin | Mass by volume | Hardness | End product Tensile strength | Electrical resistivity | Resilience | Flexural strength |
|---|---|---|---|---|---|---|---|
| % | % | g/cc | HB | N/mm$^2$ | $\Omega \times$ cm | J/cm$^2$ | N/mm$^2$ |
| 0 | 0 | 7.4 | 105 | 10 to 20 | ~10$^{-4}$ | ~0.5 | 20 to 40 |
| 0.4 | 2.5 | 7.3 | 100 | 60 | 0.02 | 0.8 | 120 |
| 0.7 | 4.5 | 7.25 | 95 | 80 | 0.03 | 0.9 | 160 |
| 1 | 6.4 | 7.2 | 90 | 95 | 0.03 | 1 | 190 |
| 1.5 | 9.2 | 7.0 | 90 | 105 | 0.10 | 1.4 | 210 |
| 2.3 | 13.4 | 6.75 | 85 | 110 | 0.8 | 1.6 | 220 |
| 3 | 17.5 | 6.5 | 80 | 100 | not measured | not measured | 200 |
| 4 | 21 | 6.3 | 75 | 95 | 40 | 1.6 | 190 |
| 5 | 26 | moldings heavily deformed | 60 | 85 | not measured | not measured | 170 |
| 10 | 42 |  | 50 | 70 | not measured | not measured | 140 |
| 100 | 100 | 1.2 | 35 | 35 | 00 | ~1 | 70 |

An optimum zone for strength and resilience is found to exist on either side of approximately 2% by weight of resin, i.e. 12% by volume of the end product. Where there is equality of properties, it is of advantage to manufacture the material which contains the least resin because it will be harder.

EXAMPLE 2

Commercial grade aluminum powder (grain size less than 150 $\mu$) is mixed dry for a period of 60 minutes with various proportions of powdered epoxy resin with a grain size of less than 50 $\mu$ (type Scotchcast 265).

The mixture is compressed at ambient temperature under a pressure of 150 to 300 N/mm$^2$ in a floating mold with walls lubricated with stearic acid, to obtain mechanical test specimens. Residual porosity is less than 5% after compression under 150 N/mm$^2$, and less than 2% after compression under 300 N/mm$^2$.

The moldings are baked in air for 20 minutes at 200°C.

The results obtained are set out in the following table:

| Proportion of resin by mass % | Proportion of resin by volume % | Compression pressure N/mm$^2$ | Mass by volume g/cc | Hardness HB | Tensile strength N/mm$^2$ |
|---|---|---|---|---|---|
| 0 | 0 | 300 | 2.6 | 40 | 10 |
| 3 | 6.5 | 300 | 2.45 | 30 | 60 |
| 6 | 12.5 | 300 | 2.35 | 25 | 65 |
| 9 | 18 | 300 | moldings deformed after baking | | |
| 12 | 23.5 | 300 | exudation of the resin | | |
| 0 | 0 | 150 | 2.4 | 20 | 5 |
| 3 | 6.5 | 150 | 2.35 | 23 | 55 |
| 6 | 12.5 | 150 | 2.3 | 21 | 62 |
| 9 | 18 | 150 | 2.25 | 19 | 58 |
| 12 | 23.5 | 150 | 2.2 | 17 | 55 |
| 15 | 29 | 150 | 2.1 | 16 | 50 |

Once again, there is an optimum zone in the composition of the end product for maximum mechanical strength, i.e. between 3% and 9% by mass of resin or approximately 5% to 20% by volume. Application of the highest compression gives more favorable mechanical properties although, beyond 6% by mass, the components are deformed through the exudation of resin during baking. In this case, the resin content has to be limited to 6% by weight.

I claim:

1. A process for manufacturing a rigid composite material, comprising preparing an intimate mixture of particles of non-porous metal of high mechanical strength and high ductility and an organic thermosetting or thermoplastic resinous plastics material which has high mechanical strength and strong adhesion to the metal particles in a proportion by volume corresponding to 5 to 20%, molding the resulting mixture in a closed mold under a pressure of at least twice the elastic limit of the metal, opening the mold, heating the compact thus obtained to a sufficiently high temperature to melt and, optionally, polymerize the plastic binder, followed by cooling.

2. A process as claimed in claim 1, wherein compression is sufficient to subject the metal particles to cold-working.

3. A process as claimed in claim 1, wherein the molding pressure is between 100 and 1000 N/mm$^2$.

4. A process as claimed in claim 1, wherein the binder is a thermosetting resin.

5. A process as claimed in claim 1 wherein the binder is introduced into the mixture in powder form.

6. A process as claimed in claim 1, wherein the mixture consists of metal particles coated with a liquid binder.

* * * * *